Oct. 25, 1927.
F. POLLAND
1,646,706
EXHIBITION APPARATUS
Filed Dec. 4, 1925   4 Sheets-Sheet 1
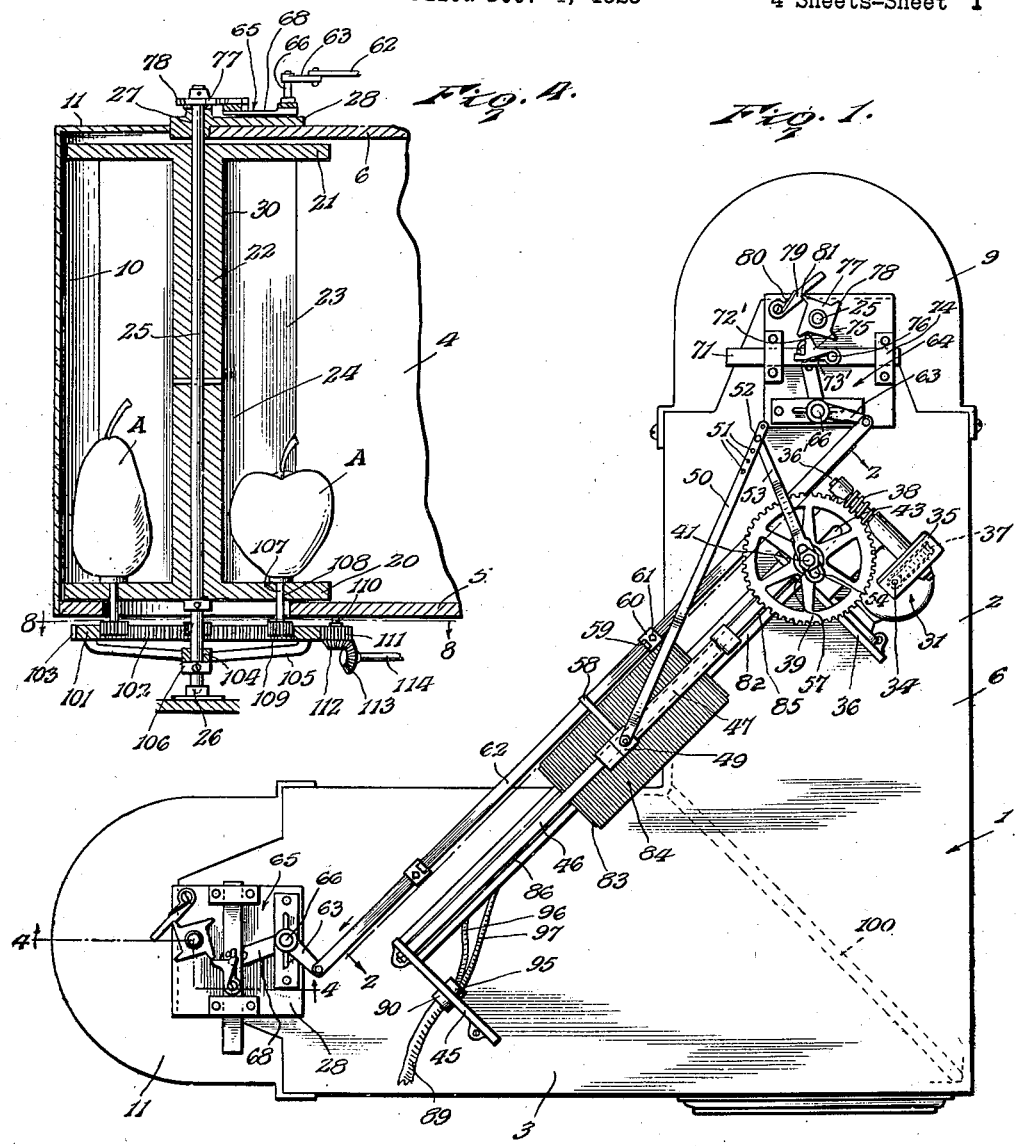
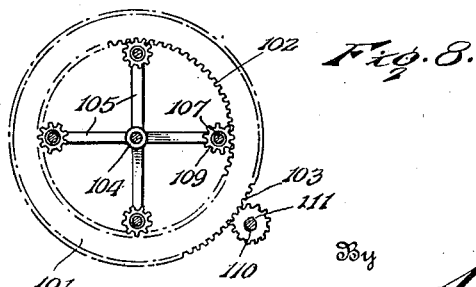
Inventor
F. Polland.
By Lacy & Lacy, Attorneys

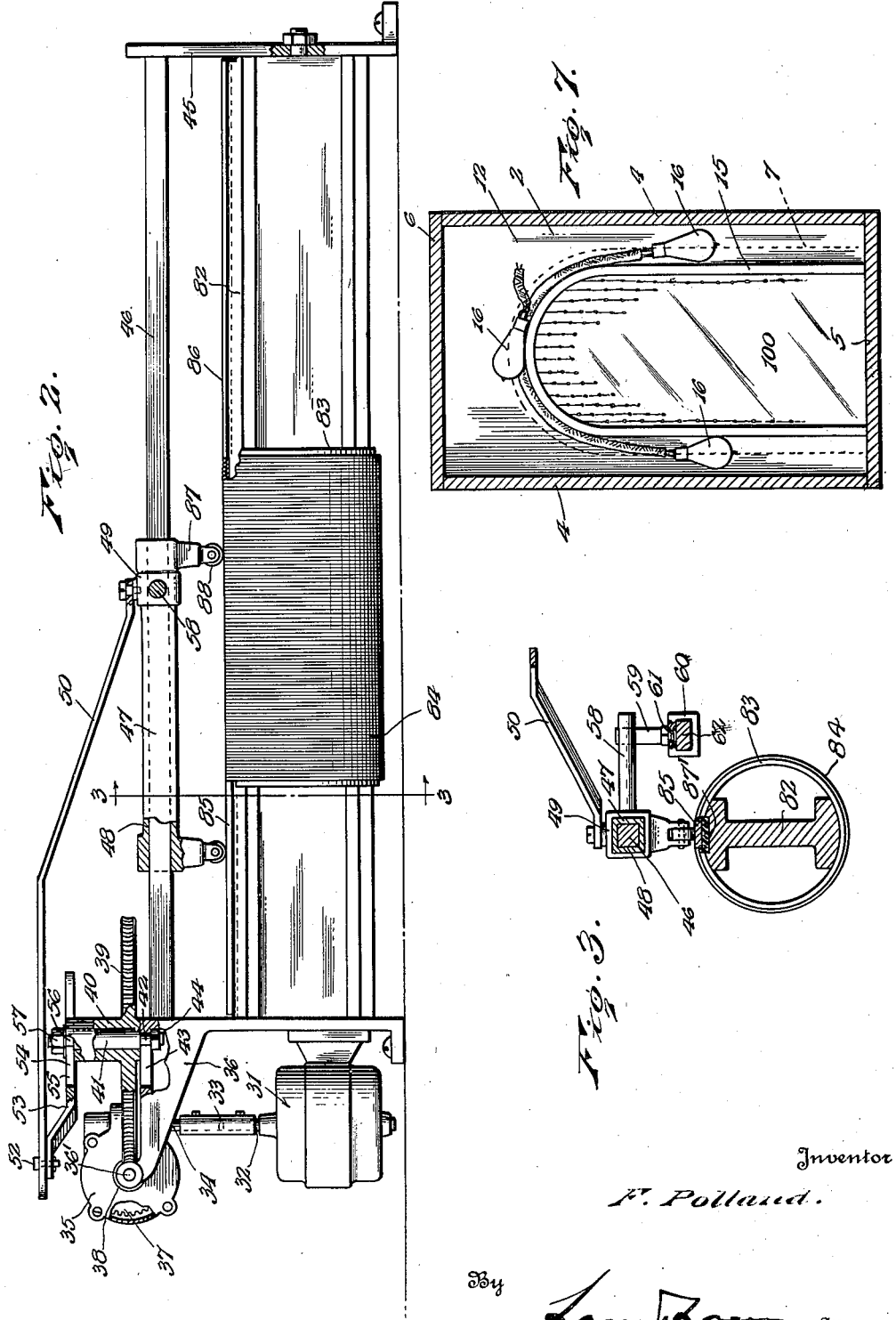

Oct. 25, 1927.  
F. POLLAND  
1,646,706  
EXHIBITION APPARATUS  
Filed Dec. 4, 1925  
4 Sheets-Sheet 3
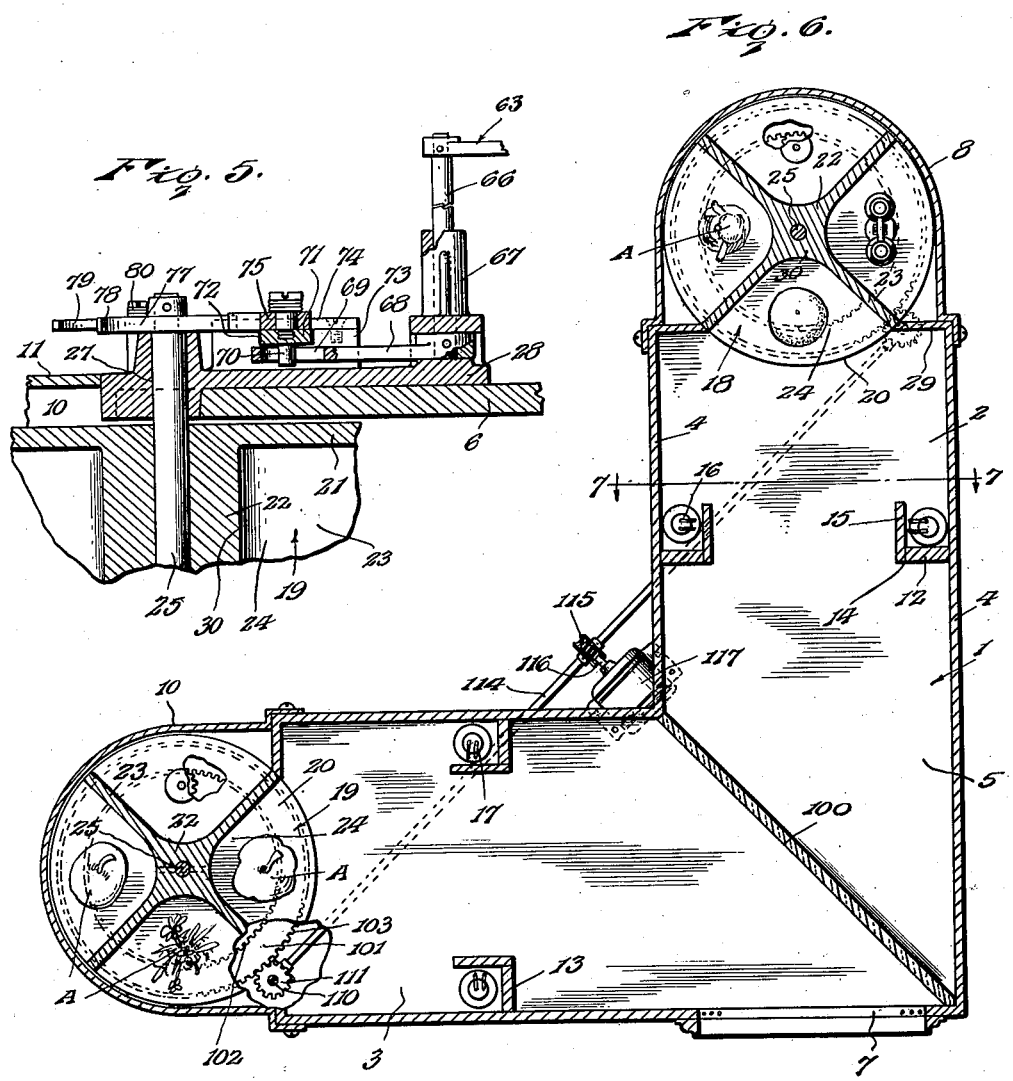
Inventor  
F. Polland.  
By Lacey & Lacey, Attorneys

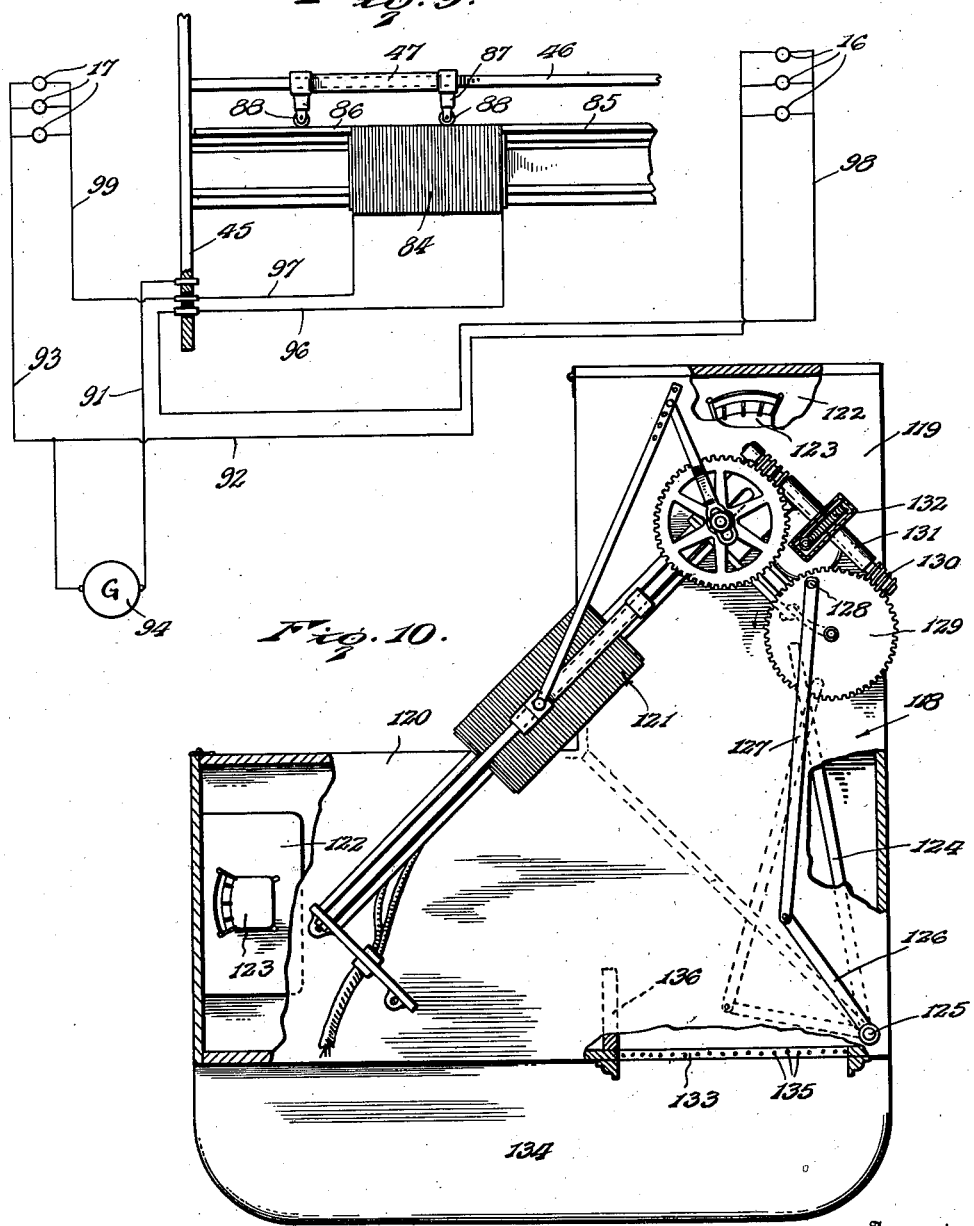

Patented Oct. 25, 1927.

1,646,706

UNITED STATES PATENT OFFICE.

FRED POLLAND, OF TOLEDO, OHIO.

EXHIBITION APPARATUS.

Application filed December 4, 1925. Serial No. 73,251.

This invention relates to improvements in exhibition apparatus and the general object of the invention is to provide an apparatus by which articles of merchandise may be attractively displayed in a manner to insure of attraction of the attention of observers, the invention contemplating the provision of means for displaying an article, effecting the apparent disappearance of said object or article, and the appearance of another article in its place, so that, in the operation of the apparatus, there is present the factor of mystification, which, as is well known, is a factor which attracts and holds the attention of an observer.

In another aspect of the invention, it is contemplated that living models be exhibited in a similar manner for the purpose of displaying wearing apparel, so that the invention is not restricted to the exhibition of inanimate objects or articles of merchandise, the effect of disappearance and change being produced in this aspect of the invention as in the case of the exhibition of inanimate objects.

Another object of the invention is to provide an exhibition apparatus extremely simple in construction and embodying a medium by which objects may be exhibited by direct vision and likewise by reflection, without the employment of mirrors and without the presence of the said medium being conspicuously visible to an observer, so that the mystifying effect of disappearance and reappearance or substitution of one object by another may be brought about in a manner to attract and hold the attention of the observer of the apparatus.

Another object of the invention is to provide means whereby a great variety of articles of merchandise or the like may be exhibited in succession, so that the exhibition is not a monotonous one, but highly interesting.

The invention contemplates effecting the change of one object to another through the successive display of objects or articles by direct vision and by reflection, and through successive and alternate illumination and occultation of the objects to be displayed, and in this connection the invention has as its object to provide novel means for controlling the electric light bulbs, or the supply of current thereto, in consonance with the successive display of the articles or objects, so that the operation of the apparatus is entirely automatic.

In the accompanying drawings:

Figure 1 is a top plan view of the exhibition apparatus embodying the invention.

Figure 2 is a vertical sectional view taken substantially on the line 2—2 of Figure 1, looking in the direction indicated by the arrows, most of the parts being shown in elevation.

Figure 3 is a vertical sectional view taken substantially on the line 3—3 of Figure 2, looking in the direction indicated by the arrows.

Figure 4 is a vertical sectional view taken substantially on the line 4—4 of Figure 1, looking in the direction indicated by the arrows.

Figure 5 is a detail sectional view on an enlarged scale illustrating the mechanism shown at the top of Figure 4.

Figure 6 is a horizontal sectional view through the apparatus looking in a downward direction.

Figure 7 is a vertical transverse sectional view taken substantially on the line 7—7 of Figure 6, looking in the direction indicated by the arrows.

Figure 8 is a detail horizontal sectional view taken substantially on the line 8—8 of Figure 4, looking in a downward direction.

Figure 9 is a diagrammatic view illustrating the electrical circuits for controlling the operation of the apparatus.

Figure 10 is a view similar to Figure 1, illustrating the embodiment of the apparatus in which living models are to be exhibited.

The exhibiting apparatus embodying the invention may be constructed in cabinet form, as illustrated in the several figures of the drawings, with the exception of Figure 10, or its component parts may be arranged in a store window, in either instance constituting means for displaying articles of merchandise or the like, or it may be constructed upon a stage or platform for the exhibition of living models, as for example, in the display of evening gowns and other wearing apparel. Therefore, what is disclosed in the drawings is intended to be merely representative of one of many embodiments of the invention.

In the embodiment illustrated in Figure 1, and the associated figures, the invention is arranged in cabinet form, and in these figures the cabinet is indicated in general by the numeral 1, and may be of any desired dimensions and shape, as for example the L-shape shown in Figures 1 and 6 of the drawings, the only requirement being that the cabinet shall comprise two chambers indicated, one by the numeral 2 and the other by the numeral 3, and these chambers are disposed at right angles to each other. The cabinet, in this embodiment of the invention, comprises side walls 4, a bottom 5, and a top 6, and in order that the articles of merchandise to be exhibited may be displayed to view, the wall 4 of the chamber 3 which constitutes the longer wall and, in a sense, the front wall of the cabinet as a whole, is provided with an opening 7 located directly opposite and in alinement with the rear end of the chamber 2, this opening being of a width nearly equal to the width of the said chamber. The chamber 2 is closed at its rear end, or outer end, by an end wall 8, preferably of the substantially semi-cylindrical form shown in Figure 6 of the drawings, and likewise by a top 9, the end closure being separably connected with the rear end of the chamber 2 or other means being provided whereby access may be had to this end of the chamber for the purpose of arranging the articles of merchandise to be displayed and which articles are supported in a manner to be presently explained. In a like manner, the outer end of the chamber 3 is closed by an end wall 10 and top 11, corresponding to the end wall 8 and top 9 just described. For a purpose to be presently made apparent, the interiors of the chambers 2 and 3 are either painted black or lined with black cloth or other material, and arranged within the said chambers are partition walls, indicated respectively by the numerals 12 and 13, these walls being each provided with an opening 14 preferably arch-shaped at its upper end, and a relatively narrow wall 15 is positioned within the opening 14 of each partition wall and extends vertically at the opposite sides of the said opening and at the top thereof, the wall 15 in each chamber extending in the direction of the end of the chamber. Light bulbs 16 and 17 are arranged within the chambers 2 and 3 respectively, and between the side walls of the chambers and the walls 15, so that the light rays from these bulbs will be directed toward the rear end of the chamber 2 and toward the outer end of the chamber 3, and thus flood the exhibits which are positioned within the ends 8 and 10 of the chambers with light rays under conditions to be presently explained in the operation of the apparatus, without, however, permitting any of the light rays to pass directly from the said bulbs toward the meeting ends of the chambers.

Rotatably arranged within the end of each of the chambers 2 and 3 is a rotatable support for the articles or objects to be exhibited, and these supports are indicated respectively, in general, by the numerals 18 and 19. As clearly illustrated in Figures 4, 5 and 6 of the drawings, each of these supports comprises a circular base or platform 20, a circular head 21 of the same diameter as the base 20, a substantially solid central or axially located upright 22, and radial walls 23, which define compartments 24 within which and upon the base 20, the articles or objects to be displayed are supported, either directly, if the said articles or objects are to remain, in themselves, stationary, or through the medium of an auxiliary supporting means, if they are to be given motion in the operation of the apparatus, and as illustrated in the drawings and as will presently be more fully described. The walls 23, as well as the base 20 and head 21 are either painted black or lined or draped with black cloth or other material, and in order that each support may be rotated, in the operation of the apparatus, a shaft 25 is extended vertically through the upright 22 of each support and fixed with relation thereto, the shaft being journaled at its lower end in a step bearing 26 upon a fixed part of the cabinet and at its upper end in a suitable bearing 27. Each bearing 27 constitutes an integral part of a base plate 28 which is secured in any suitable manner upon the top 6 of the cabinet and means, which will now be described, is provided for imparting intermittent rotative movement to the support 18 so that the compartments 24 of the support may be successively brought to position for the display of the articles or objects mounted therein, and in order that the interior of one compartment only may be displayed at one period of operation of the apparatus, a partition wall 29 is arranged within each chamber 2 and 3 at the juncture of the ends 8 and 10 with the said chambers, and the opposing edges of these walls are so spaced that when each support has been rotated to position to display the object or article arranged within one of its compartments, the outer edges of the walls 23 which define said compartment will be in registration with the said edges of the partition walls 29, as clearly shown in Figure 6 of the drawings. It will also be observed by reference to this figure that the inner surfaces of the walls 23 are merged with the surface of the upright 22, so that each compartment is of transversely curvilinear form at its rear, as indicated by the numeral 30.

The apparatus is operated through the medium of an electric motor, which is indicated by the numeral 31, and the shaft 32 of this motor is coupled, as at 33, with a worm shaft 34 mounted in a gear casing 35 supported by a suitable bracket 36 upon the top of the cabinet above the chamber 2 thereof. The said worm shaft 34 meshes with a worm gear 37 mounted in said casing 35 upon a shaft 36', and said shaft 36' is provided with a worm 38 which in turn meshes with a worm gear 39 having a hub 40 which is rotatably mounted upon a shaft 41 having its lower end reduced as at 42 and fitted through a slot 43 in the upper portion of the bracket 36, the shoulder formed by reducing this end of the shaft engaging the upper side of the top of the bracket, and a nut 44 being threaded onto the said reduced end 42 of the shaft and being tightened to bear against the under side of the said top of the bracket, so that gears 39 of different diameters may be substituted one for another and the shaft 41 adjusted in the slot 43 to effect meshing of gears of different diameters with the worm 38. The numeral 45 indicates a bracket which is mounted in opposition to the bracket 36 and upon the top 6 of the cabinet above the chamber 3, and a bar 46, rectangular in cross section, is supported at its ends by the said brackets and extends between the same and diagonally of the angularly disposed portions of the cabinet. A sleeve 47 is slidably mounted upon the bar 46, being provided with a rectangular bore 48, for this purpose, and fixed upon this sleeve is a collar 49 to which is pivoted one end of a pitman 50. At its other end, the pitman 50 is provided with a longitudinal series of openings 51, and a pivot pin 52 is interchangeably fitted through these openings and through an opening in the outer end of an arm 53 which arm is seated at its inner end portion in a slot 54 formed diametrically in the upper end of the hub 40 of the gear 39, this portion of the said arm being formed with a longitudinal slot 55 accommodating the reduced upper end 56 of the shaft 41, and a nut 57 being threaded onto the reduced upper end of said shaft to prevent upward displacement of the arm 53, it being understood that due to the engagement of the arm in the slot 54, the arm is held for rotation with the gear 39. At this point it will be noted that where gears 39 of different diameters are substituted one for another, adjustment of the arm 53 to vary its effective throw may be effected by loosening the nut 57, longitudinally adjusting the arm 53 in the slot 54, and then tightening the said nut. It will likewise be evident that as the gear 39 is rotated through the medium of the motor 31 and interposed system of gearing, rotary motion will be imparted to the arm 53 and, through the medium of the connecting bar or pitman rod 50, reciprocatory motion will be imparted to the sleeve 47. The sleeve 47 is provided with a laterally projecting trip finger 58 which coacts alternately with abutments 59 which are carried by collars 60 adjustably secured by set screws 61 upon a bar 62 which is pivotally connected at its ends to the outer ends of crank arms 63 which constitute elements of the mechanisms which are associated with the exhibit supports 18 and 19 for effecting intermittent rotation of said supports and which mechanisms are respectively indicated by the numerals 64 and 65. The arms 63 are fixed at the upper ends of rock shafts 66 journaled in suitable bearings 67 upon the base plate 28, and fixed to the lower end of each rock shaft is an arm 68 which is formed near its outer end with a longitudinal slot 69 accommodating a stud 70 which projects downwardly from the under side of a shiftable bar 71 mounted at its end portions in recesses 72 formed in the upper sides of bearing bosses 73 provided upon the upper side of the said base plate 28, the bar being held against upward displacement by cap plates 74 secured upon the upper sides of the said bearing bosses. A pawl 75 is pivotally mounted as at 76, upon the shiftable bar 71 and is provided with a tooth 72' and is yieldably held, by a spring 73', in engagement with a ratchet 77 fixed upon the upper end of the respective shaft 25, the ratchet having a number of teeth 78 corresponding to the number of compartments 24 embraced in each of the supports 18 and 19. A detent 79 is mounted upon the base plate 28 and is held by a spring 80 in coactive engagement with the teeth of the said ratchet 77, the detent being provided with a shoulder 81 against which the abrupt faces of the teeth 78 are adapted to engage to prevent backward rotation of the respective supports 18 or 19 as the case may be.

It will now be understood that as the sleeve 47 is reciprocated upon the bar 46, through the rotation of the worm gear 39 and through the medium of the connecting bar 50, the trip finger 58 will, on one movement of the sleeve, engage the abutment 59 which is, for example, next adjacent the mechanism 64, and, at such time, the arm 63 will be swung in a direction to effect rotation of the shaft 66 of the other mechanism, which is indicated by the numeral 65, thereby effecting reciprocation or shifting of the shiftable bar 71 and causing the pawl 75 carried by the respective bar to move over one of the teeth of the ratchet 77 and engage behind the abrupt face of the said tooth. As the bar 62 is shifted in the manner stated, rocking motion will be imparted to the arm 63 which is associated with the mechanism 64 to effect shifting of the corresponding shiftable bar 71 to effect rotation of the shaft 25, through coaction of the pawl tooth 72 with the ratchet 77, and thus impart a one-quarter turn to the support 18. Upon reverse reciprocation of the bar 62 through coaction of the trip finger 58 with the other abutment, rotary motion will be imparted to the shaft 25 of the support 19 through one-quarter of a revolution, and the pawl 75 which is associated with the ratchet 77 upon the shaft 25 of the support 18 will ride past a tooth of said ratchet to engage behind the abrupt face thereof. In this manner, the supports 18 and 19 are alternately rotated one-quarter of a revolution so as to alternately successively bring the compartments 24 thereof into exhibiting position.

The invention contemplates the provision of means for effecting alternate energization of the lights 16 and 17 so as to effect illumination of the articles or objects displayed upon the supports 18 and 19, alternately, and with this end in view a beam or other supporting member 82 is fixed at its ends to the brackets 36 and 45 and extends between the same, and a core 83 of insulating material is mounted upon the intermediate portion of this supporting member and supports a resistance coil 84. The terminals of the winding of the coil are electrically connected with contact strips 85 and 86 which are mounted upon insulating strips 87′ supported upon the upper side of the beam 82. The sleeve 47 is provided at its ends with downwardly extending yokes 87 in which are journaled rollers 88 designed to ride over the resistance winding 84 and over the contact strips 85 and 86, as most clearly shown in Figures 2, 3 and 9 of the drawings. The numeral 89 indicates a cable with which is associated a plug 90, and wires 91, 92 and 93 are carried in the cable, said wires 92 and 93 leading from one side of the source of current supply and the wire 91 leading from the opposite side of said source, which is here illustrated as a generator indicated by the numeral 94. The plug 90 and a socket therefor, indicated by the numeral 95, and which socket is mounted upon the bracket 45, are so constructed that the wire 91 will be grounded to the bracket 45 and consequently in circuit with the bar 46 which extends between the bracket and the bracket 36, a wire 96 being led from one terminal of the socket 95 to one terminal of the winding of the resistance 84 and a wire 97 being led from the remaining terminal of the socket 95 to the other terminal of the said winding of the resistance 84. The wire 92 leads to one side of the series of light bulbs 16, and a wire 98 leads from the other side of the said bulbs and is in circuit with the wire 96. The wire 93 leads to one side of the series of light bulbs 17 and a wire 99 leads from the other side of said bulbs and is in circuit with the wire 97. It will now be evident that with the sleeve 47 in the position illustrated in Figure 9 of the drawings, one of the rollers 88 is in contact with the winding of the resistance 84 and the other roller 88 is in contact with the contact strip 86, and that inasmuch as the current will take the path of least resistance, it will flow through the wire 93, the light bulbs 17, the wire 99, the wire 97, the strip 86, the roller 88 which contacts said strip, and to ground through the frame, returning to the source of supply through the wire 91 which is the ground wire. On the other hand, current flowing through the wire 92 and through the light bulbs 16 and wires 98 and 96, must pass through the part of the resistance between the terminal to which the wire 96 is connected and the point of contact of the roller 88 which is at that time electrically engaged with the resistance, so that the light bulbs 17 will be fully energized whereas the light bulbs 16 will be more or less dim, and as the sleeve 47 is moved along the bar 46 in the direction of the bracket 45 greater resistance will be offered to the passage of current to the bulbs 16, until finally the bulbs 16 are totally extinguished. On the reverse travel of the sleeve 47, the bulbs 17 will be gradually dimmed and the bulbs 16 will be energized to flood the respective exhibits with light rays. Of course, when both rollers 86 are in contact with the winding of the resistance 84, an equal amount of current will be supplied to both series of bulbs. Therefore, in the operation of the apparatus, one exhibit will, at one period, be flooded with light rays and the other exhibit will be obliterated because of the extinguishment of the light bulbs associated therewith, and, at such period in the operation of the apparatus, the sleeve 47 will be at one limit of its travel or movement and, as it moves from this limit toward the other limit, the bulbs which were previously supplied with current will be gradually dimmed through the gradually increasing resistance offered to the passage of current thereto, and the bulbs which were previously totally extinguished will be gradually supplied with an increasing amount of current until the before stated conditions have been reversed.

The numeral 100 indicates a pane of plate glass which is mounted within the cabinet to extend at an angle of forty-five degrees at the juncture of the two chambers 2 and 3, and this pane of glass constitutes both a light ray transmitting and a light ray reflecting medium, so that when the chamber 2 is illuminated, the exhibits in the end of the chamber may be viewed by direct vision or, in other words, by transmitted light, through the opening 7 and, on the other hand, when the chamber 2 is darkened and the chamber 3 is illuminated, the exhibit in the end of the said chamber 3 will be visible through reflected light rays, the pane 100 then constituting, in effect, a mirror, due to the black painted or lined interior of the chamber 2. Therefore, in the operation of the apparatus, the gearing and other mechanical devices for imparting intermittent rotary motion to the supports for the articles to be displayed, and the controlling means for the sources of illumination being arranged to operate in consonance, the object which is within the compartment 24 of, for example, the support 18, is visible at the time the lights 16 are energized, by being viewed directly through the light ray transmitting and reflecting medium 100, and during the period the chamber 2 is fully illuminated by these light bulbs and the chamber 3 is totally dark due to extinguishment of the bulbs 17, the actuating mechanism for the supports is automatically operating to effect rotation of the support 19 one-quarter of a turn. Obviously, therefore, the rotation of this support is not visible to the observer, and at this period one of the compartments of the support 19 will be brought to display position. Therefore, when the chamber 2 is darkened and the chamber 3 is illuminated, the article or object which is arranged within the said compartment of the support 19 will be visible by reflected light rays, and at each period of invisibility the support will be rotated through the rotating mechanism, one-quarter of a revolution to bring into display position the article or object arranged within the succeeding of its compartments. At a period intermediate the periods of total obscurance of one exhibit and full illumination of another exhibit, there will be substantially equal illumination of the two compartments and at this time the two images will apparently blend into each other and there will be a gradual fading away of one image and a gradual appearance of the other image, so that a very startling and mystifying effect is produced.

As heretofore explained, the articles which are indicated by the reference letter A, in the drawings, may be either fixedly disposed upon the base 20 of each support 18 and 19, or, as illustrated in the drawings and as will now be explained, motion may be imparted to the said objects or articles during the periods of display, thus enhancing the factor of mystification and adding materially to the attractiveness of the exhibition.

The means referred to above is most clearly illustrated in Figures 4, 6 and 8 of the drawings and the same includes a ring gear which is indicated by the numeral 101 and which is provided upon its inner periphery with teeth 102 and upon its outer perihery with teeth 103. The said gear is supported from a hub 104 by means of spokes 105 radiating from the hub and connected with the body of the gear, and the said hub is freely rotatably mounted upon the lower portion of the shaft 25, a collar 106 being secured upon the shaft 25 to support the hub 104. In this case, the articles or objects A are mounted upon shafts 107 rotatably journaled in openings 108 in the base 20 of the respective support, and pinions 109 are fixed upon the lower ends of the shafts and mesh with the internal teeth 102 of the ring gear. In juxtaposition to each ring gear 101 and mounted for rotation upon a stub shaft 110 upon the bottom of the cabinet, is a pinion having a vertical toothed portion 111 meshing with the external teeth 103 of the ring gear, and a beveled toothed portion 112 meshing with a pinion 113 at the adjacent end of a shaft 114. The shaft 114 extends between the beveled pinions 113 and the gears or pinions 111 and has fixed upon it at an intermediate point, a worm gear 115 driven from a worm upon the shaft 116 of a motor 117 of the electric type. It will now be evident that if the articles or objects A are fixed upon the respective shafts 107, the said articles or objects will be rotated continuously, or the shafts 107 may extend upwardly into the articles or objects and the said articles or objects may be articulated and the shafts may then constitute a means for actuating any suitable gearing or other mechanism within one or another of the objects for the purpose of imparting motion to the articulated parts thereof, in which event, of course, the article or object per se will be fixed with relation to the support so that it cannot bodily rotate.

It will be understood, of course, that any number of the electric light bulbs 16 and 17 may be employed and that each of the supports 18 and 19 may embody any desired number of the compartments 24, it being understood that the rotating mechanisms 64 and 65 will be modified accordingly by substitution of ratchets 77 having teeth corresponding in number to the number of such compartments. Likewise, it will be evident that the frequency with which the exhibits are displayed may be varied by the substitution of gears 39 of different diameters, as previously pointed out.

The embodiment of the invention illustrated in Figure 10 of the drawings is designed more especially for the display or exhibition of living models in demonstrating the beauty and attractiveness of evening gowns, wraps, hats, and other articles of wearing apparel. In this embodiment, the numeral 118 indicates in general a casing which does not differ essentially from the casing of the previously described embodiment, except that it will, of course, be of sufficiently large dimensions to serve the purpose for which it is intended. This casing includes a chamber 119 and a chamber 120 corresponding to the chambers 2 and 3 shown in Figure 6 of the drawings. Likewise, in this embodiment, the same lighting arrangement is employed as in the previously described embodiment and the same mechanism, indicated in general by the numeral 121, is employed to control the supply of current to the lights so as to alternately successively illuminate the chambers 119 and 120. In this embodiment, however, the rotary supports 18 and 19 of the previously described embodiment are not necessarily employed but instead, a platform may be arranged in the end of each of the chambers 119 and 120, as indicated by the numeral 122, and a chair 123 or the like may be arranged upon the platform, although, if desired, the platform may be dispensed with as also the chair. However, the said Figure 10 is intended to represent in a general manner, only one possible embodiment of the invention as adapted to the exhibition of living models, and numerous other specific arrangements may be resorted to without departing from the spirit of the invention.

In this embodiment of the invention, the light ray transmitting and reflecting medium which is, as in the previously described embodiment, in the form of a pane 124 of glass, is supported upon a rocking shaft 125 mounted in the corner between the outer side wall of the chamber 119 and the front wall of the chamber 120 and, in the rotation of the shaft through one-eighth of a revolution, the said medium 124 is adapted to be brought to position extending across the interior of the structure at the juncture of the two chambers and at an angle of forty-five degrees with respect to the side walls thereof, and in another position is designed to substantially lie against the inner side of the outer side wall of the chamber 119. In order that this movement of the pane 124 may be effected, an arm 126 is fixed at one end to the upper end of the shaft 125, and a connecting rod 127 is connected to the outer end of the said arm and to a crank pin 128 upon the upper side of a worm gear 129, this gear being rotatably mounted upon the top of the structure and meshing with a worm 130 upon an extension 131 of the shaft of a worm gear 132 which constitutes precisely the equivalent of the gear 37 previously described. An opening is provided in the front wall of the structure, indicated by the numeral 133, and corresponds to the opening 7 of the first described form except that it is of sufficient height and width to readily permit of the passage therethrough of a person. It will now be evident that in the rotation of the worm gear 129, oscillatory or swinging movement will be imparted to the arm 126 so as to move the light ray transmitting and reflecting medium 124 from one of its said positions to the other. This movement is so timed that the following operation and procedure may be carried out. The model who is to give the demonstration will appear seated in the chair 123 in the chamber 119, at the beginning of the operation, this chamber being at such time flooded with light rays and the light ray transmitting pane 124 being in position extending diagonally across the interior of the structure opposite the opening 133, the chamber 120 being, at such time, darkened, due to extinguishment of the light sources therein. In the continued operation of the apparatus, the model will arise from her seat and walk forwardly within the chamber 119 in the direction of the opening 133 and, at this time, the glass pane 124 will be swung inwardly and rearwardly until finally it comes to rest substantially against the outer side wall of the structure, thus permitting the model to pass the pane and through the opening 133 onto a platform 134 which is preferably constructed and arranged in front of the structure 118 and upon this platform the model may demonstrate the attractive features of the garment which is to be exhibited. After such display, the operation of the apparatus having been interrupted after the pane 124 has reached the position stated, the model returns through the opening 133 and walks rearwardly within the chamber 119 and seats herself in the chair 123, and at the moment she passes the pane 124, the apparatus is set in operation and by the time she has seated herself, the pane 124 will have been returned to its original position extending diagonally across the interior of the structure. Likewise, at this time, the mechanism for controlling the flow of current to the light bulbs for illuminating the chambers 119 and 120 will operate to gradually dim and finally extinguish the lights within the chamber 119 and increase the amount of current flowing to the light bulbs within the chamber 120, so that it will appear to the observers that the model fades out of view, and inasmuch as the chair 123 within the chamber 120 is positioned precisely in accordance with the chair 123 within the chamber 119, and the first mentioned chair is at this time displayed to the view of the observer by reflected light rays, it will appear as though the model had faded into air, the chair, however, remaining in position. In this manner, a very mystifying effect is produced and the observers will naturally, out of curiosity, await repetitions of the exhibition. In order that the movement of the light ray transmitting and reflecting pane 124 may not be observed during the exhibition, beaded or other similar rope-like strands or drapes 135 are arranged within the opening 133 and depend for substantially the entire height of said opening. It will be evident that the only part of the pane 124 which might otherwise be visible is the free vertical edge thereof and by providing these attenuated drapes 135, the movement of this edge across the path of vision is rendered imperceptible. It will be understood, of course, that in this embodiment of the invention, the apparatus need not necessarily be limited to the exhibition of one model alone, but, if constructed on a large scale, a number of models might exhibit the gowns or other articles of wearing apparel, in which they are attired, as a group.

If desired, a vision obscuring strip 136 may be mounted at that side of the opening 133 which is nearer the exhibit accommodating end of the chamber 120, so as to obscure the vision of an observer attempting to observe the interior of said chamber.

In the embodiments of the invention, the interiors of the display chambers have been described as lined with black cloth or other similar material, or painted black, but it will be understood that any dark neutral color may be employed instead of black or, in other words, any color which will not appreciably reflect light rays, and, therefore, it may be said that the interiors of the chambers are of a non-light ray reflecting color.

With further reference to the embodiment of the invention illustrated in Figure 10 of the drawings, it will be understood that if desired, this embodiment might be employed by a magician in the following manner. The magician will appear seated in the chamber 119 when the chamber is illuminated, and, arising from his seat, will walk through the chamber and out through the opening 133 onto the platform 134 where he will perform his acts of legerdemain. At the time the magician is performing on the platform 134, the apparatus will be still, but after his performance and as he re-enters the chamber 119, the apparatus will be set in motion and, when the chamber 119 is darkened and the chamber 120 illuminated, it will appear to the observer that he has faded into air.

Having thus described the invention, what I claim is:

1. Exhibition apparatus comprising relatively angularly disposed display chambers, a combined light ray transmitting and reflecting medium obliquely disposed between the meeting sides of the chambers, rotary means for supporting a plurality of exhibits within each of said chambers, continuously operating means for imparting intermittent rotary movement in a constant direction to said supporting means alternately whereby to successively bring exhibits supported thereby into position for exhibition, one chamber having a vision opening in one wall confronting said medium, and means for automatically alternately illuminating and darkening the chambers in consonance with and controlling the operation of the means for imparting motion to the exhibit supporting means.

2. Exhibition apparatus comprising relatively angularly disposed display chambers, a combined light ray transmitting and reflecting medium obliquely disposed between the meeting sides of the chambers, means within each chamber for supporting a plurality of exhibits, means for consonantly adjusting the said exhibit supporting means of the two chambers to successively bring the exhibits supported thereby into position for exhibition, one chamber having a vision opening in one wall confronting said light ray transmitting and reflecting medium, and means for automatically alternately illuminating and darkening the chambers in consonance with the adjustment of the exhibit supporting means.

3. Exhibition apparatus comprising relatively angularly disposed display chambers, a combined light ray transmitting and reflecting medium obliquely disposed between the meeting sides of the chambers, one chamber having a vision opening in one wall confronting the said medium, means within each chamber for supporting exhibits and adjustable to successively bring the exhibits supported thereby into position for exhibition, means for automaically alternately illuminating and darkening the chambers, and means operating in consonance therewith for automatically adjusting the exhibit supporting means of each chamber during the period in which the chamber is darkened.

4. Exhibition apparatus comprising relatively angularly disposed display chambers, a combined light ray transmitting and reflecting medium obliquely disposed between the meeting sides of the chambers, one chamber having a vision opening in one wall confronting the said medium, a rotary exhibit support within each chamber embodying a plurality of exhibit compartments, means for automatically alternately imparting intermittent rotary motion to the supports to successively alternately bring the compartments into position confronting the said medium, and means operating in consonance with the last mentioned means for illuminating each chamber during the period the exhibit therein is in position for display and darkening the other chamber substantially during the said period and while the exhibit support therein is being rotated.

5. Exhibition apparatus comprising relatively angularly disposed display chambers, a combined light ray transmitting and reflecting medium obliquely disposed between the meeting sides of the chambers, one chamber having a vision opening in one wall confronting the said medium, an exhibit support within each chamber and each embodying a plurality of independent exhibit compartments, the said supports being individually movable to successively bring the compartments thereof into position confronting the said medium, means operating automatically for imparting intermittent motion in a constant direction to the support alternately to so adjust the same, and means operating in consonance with the last mentioned means for illuminating each chamber during the period the exhibit therein is in position for display and darkening the other chamber substantially during the said period and while the exhibit support therein is being adjusted.

6. Exhibition apparatus comprising relatively angularly disposed display chambers, a combined light ray transmitting and reflecting medium obliquely disposed between the meeting sides of the chambers, one chamber having a vision opening in one wall confronting the said medium, means within each chamber for the support of an exhibit, and means for automatically alternately illuminating and darkening the chambers, the said means comprising a lighting circuit, sources of illumination in said circuit arranged within each of said chambers to flood the exhibit therein with light rays when the respective sources are energized, a resistance in said circuit, a reciprocating grounded conductor, means for continuously reciprocating the same, contact strips in circuit with the terminals of the resistance, and contacts carried by the said conductor and movable over the said strips and over the resistance in the reciprocation of the said conductor whereby to interpose resistance to the passage of current to the sources of illumination in one chamber and lessen resistance to the passage of current to the sources of illumination in the other chamber simultaneously.

7. Exhibition apparatus comprising relatively angularly disposed display chambers, a combined light ray transmitting and reflecting medium obliquely disposed between the meeting sides of the chambers, one chamber having a vision opening in one wall confronting the said medium, means within each chamber for the support of an exhibit, and means for automatically alternately illuminating and darkening the chambers, the said means comprising a lighting circuit, sources of illumination in said circuit arranged within each of said chambers to flood the exhibit therein with light rays when the respective sources are energized, a resistance in said circuit, a reciprocating grounded conductor, means for continuously reciprocating the same, contact strips in circuit with the terminals of the resistance, and contacts carried by the said conductor and movable over the said strips and over the resistance in the reciprocation of said conductor whereby to interpose resistance to the passage of current to the sources of illumination in one chamber and lessen resistance to the passage of current to the sources of illumination in the other chamber simultaneously, the said exhibit supports being mounted for rotation and each embodying a plurality of exhibit compartments, and means for automatically alternately imparting intermittent rotary motion to the supports to successively alternately bring the compartments into position confronting the said medium, the said means being actuated in consonance with the movement of the said conductor.

8. Exhibition apparatus comprising relatively angularly disposed display chambers, a combined light ray transmitting and reflecting medium obliquely disposed between the meeting ends of the chambers, one chamber having a vision opening in one wall confronting the said medium, a rotary exhibit support within each chamber embodying a plurality of exhibit compartments, means for automatically alternately imparting intermittent rotary motion to the supports to successively alternately bring the compartments into position confronting said medium, means operating in consonance with the last mentioned means for illuminating said chamber during the period the exhibit therein is in position for display and darkening the other chamber substantially during said period and while the exhibit support therein is being rotated, means within each compartment of each exhibit support for supporting an exhibit, and means for imparting motion to the supporting means for each exhibit.

9. Exhibition apparatus comprising relatively angularly disposed display chambers, a combined light ray transmitting and reflecting medium obliquely disposed between the meeting ends of the chambers, one chamber having a vision opening in one wall confronting the said medium, a rotary exhibit support within each chamber embodying a plurality of exhibit compartments, means for automatically alternately imparting intermittent rotary motion to the supports to successively alternately bring the compartments into position confronting said medium, means operating in consonance with the last mentioned means for illuminating each chamber during the period the exhibit therein is in position for display and darkening the other chamber substantially during said period and while the exhibit support therein is being rotated, means within each compartment of each exhibit support for supporting an exhibit, and means operating through the medium of the said supporting means for each exhibit for imparting motion to the exhibit.

10. Exhibition apparatus comprising relatively angularly disposed display chambers, a combined light ray transmitting and reflecting medium within the space between the meeting sides of the chambers, means supporting the said medium for swinging movement into and out of position extending obliquely between the meeting sides of the chambers, one chamber having a vision opening in one wall confronting the said medium, means for automatically alternately illuminating and darkening the chambers, and means for imparting swinging movement to the said light ray transmitting and reflecting medium in consonance with the operation of the illuminating and darkening means.

11. Exhibition apparatus comprising relatively angularly disposed display chambers, a combined light ray transmitting and reflecting medium within the space between the meeting sides of the chambers, means supporting the said medium for swinging movement into and out of position extending obliquely between the meeting sides of the chambers, one chamber having a vision opening in one wall confronting the said medium, means for automatically alternately illuminating and darkening the chambers, means for imparting swinging movement to the said light ray transmitting and reflecting medium in consonance with the operation of the illuminating and darkening medium, and attenuated drapes suspended within the said vision opening.

In testimony whereof I affix my signature.

FRED POLLAND. [L. S.]